United States Patent
George et al.

(10) Patent No.: US 11,726,681 B2
(45) Date of Patent: Aug. 15, 2023

(54) METHOD AND SYSTEM FOR CONVERTING ELECTRONIC FLASH STORAGE DEVICE TO BYTE-ADDRESSABLE NONVOLATILE MEMORY MODULE

(71) Applicant: Samsung Electronics Co., Ltd., Suwon-si (KR)

(72) Inventors: Arun George, Bangalore (IN); Anshul Sharma, Bangalore (IN); Rajesh Krishnan, Bangalore (IN); Vishak G, Bangalore (IN)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 52 days.

(21) Appl. No.: 16/724,607

(22) Filed: Dec. 23, 2019

(65) Prior Publication Data

US 2021/0124508 A1 Apr. 29, 2021

(30) Foreign Application Priority Data

Oct. 23, 2019 (IN) .............................. 201941043125

(51) Int. Cl.
*G06F 3/06* (2006.01)

(52) U.S. Cl.
CPC .......... *G06F 3/0631* (2013.01); *G06F 3/0604* (2013.01); *G06F 3/0644* (2013.01);
(Continued)

(58) Field of Classification Search
CPC ........ G06F 3/06; G06F 3/0631; G06F 3/0604; G06F 3/0644; G06F 3/0647; G06F 3/0659; G06F 3/0679; G06F 3/0616; G06F 3/064
(Continued)

(56) References Cited

U.S. PATENT DOCUMENTS 9,524,110 B2 12/2016 Liao et al.
9,792,227 B2 * 10/2017 Ki ...................... G06F 12/0871
(Continued)

FOREIGN PATENT DOCUMENTS

WO WO-2014-143036 A1 9/2014

OTHER PUBLICATIONS

Abulila, Ahmed et al. FlatFlash: Exploiting the Byte-Accessibility of SSDs within a Unified Memory-Storage Hierarchy. APLOS '19, Providence RI, USA (Apr. 13-17, 2019) (Year: 2019).*

(Continued)

*Primary Examiner* — Michael Krofcheck
(74) *Attorney, Agent, or Firm* — Harness, Dickey & Piece, P.L.C.

(57) ABSTRACT

A method for converting an electronic flash storage device having a byte addressable storage (ByAS) and a block addressable flash storage (BlAS) to a single byte addressable storage includes receiving, by a host, a request for memory allocation from the ByAS, the receiving being from a first application among of a plurality of applications running on a processor; deallocating, by the host, a least relevant page allocated to at least one second application among the plurality of applications; moving, by the host, a content to the BlAS at a first BlAS location, the content related to the least relevant page, the moving based on the deallocation; allocating, by the host, the least relevant page to the first application; and updating, by the host, a cache metadata and a page lookup table of the first application and the at least one second application based on the deallocation and allocation.

14 Claims, 10 Drawing Sheets

(52) U.S. Cl.
  CPC .......... *G06F 3/0647* (2013.01); *G06F 3/0659*
              (2013.01); *G06F 3/0679* (2013.01)
(58) Field of Classification Search
  USPC ........................................................ 711/103
  See application file for complete search history.

(56) References Cited

U.S. PATENT DOCUMENTS

| | | | |
|---|---|---|---|
| 10,275,174 B2* | 4/2019 | Rogers | G06F 3/0632 |
| 2012/0124566 A1* | 5/2012 | Federighi | G06F 8/61 |
| | | | 717/174 |
| 2012/0239871 A1 | 9/2012 | Badam et al. | |
| 2014/0365715 A1* | 12/2014 | Lee | G06F 12/0868 |
| | | | 711/103 |
| 2016/0041917 A1 | 2/2016 | Trojanowski et al. | |
| 2016/0077740 A1 | 3/2016 | Hussain et al. | |
| 2017/0169233 A1 | 6/2017 | Hsu et al. | |
| 2022/0221998 A1* | 7/2022 | Xu | G06F 3/0673 |

OTHER PUBLICATIONS

Wawrzynek, John. CS 152 Computer Architecture and Engineering Lecture 9—Virtual Memory. University of California at Berkley (Sep. 29, 2019) (Year: 2019).*

Novotny, R et al. NAND Flash Memory Organization and Operation, Journal of Information Technology and Software Engineering. vol. 5 Issue 1 (2015) (Year: 2015).*

Zhou, Yuanyuan. CSE120 Principles of Operating Systems, University of California San Diego (Nov. 6, 2018) (Year: 2018).*

Condit, Jeremy et al. Better I/O Through Byte Addressable, Persistent Memory. SOSP' 09. Big Sky, MT (Oct. 11-14, 2009) (Year: 2009).*

Harris, David Money; Sarah L. Harris. Digital Design and Computer Architecture, Morgan Kaufman (2013) ISB: 9780123944245 (Year: 2013).*

Evans, Chris. What are Storage Class Memory (SCM) and Persistent Memory (PM), Architecting.it (Feb. 6, 2018) (https://www.architecting.it/blog/what-are-scm-and-pm/) (Year: 2018).*

* cited by examiner

METHOD AND SYSTEM FOR CONVERTING ELECTRONIC FLASH STORAGE DEVICE TO BYTE-ADDRESSABLE NONVOLATILE MEMORY MODULE

CROSS-REFERENCE TO RELATED APPLICATIONS

This application claims benefit of priority to Indian Patent Application No. 201941043125 filed on Oct. 23, 2019 in the Indian Intellectual Property Office, the disclosure of which is incorporated herein by reference in its entirety.

FIELD

Example embodiments relate to a memory system, and more specifically relate to a method and/or a system for converting an electronic flash storage device to a byte-addressable nonvolatile memory module, wherein the electronic flash storage device includes a byte addressable storage (ByAS) region and a block addressable storage (BlAS) region.

BACKGROUND

Some applications such as big data analytics and/or in-memory databases require large amounts of dynamic random access memory (DRAM). Since DRAM is quite expensive, memory expansion techniques using cheaper flash memory are becoming prevalent. In many of these techniques, the DRAM is used alongside an external flash storage, and together they correspond to a large RAM memory. Here, a system DRAM is used as a cache and the flash storage is used as the backend. All of these techniques require reserving a portion of the system DRAM. It would prove to be difficult if the system DRAM is limited in capacity. Also, moving data between the cache (system DRAM) and the backend (flash storage) involves reuse of the same dual inline memory module (DIMM) bus. Normal system operations will be impacted since the DIMM bandwidth is shared. Also, enabling persistence will be difficult because the data will be part of two separate devices—system DRAM and flash.

SUMMARY

Some example embodiments herein disclose a method of converting an electronic flash storage device having a ByAS and a BlAS as a single byte addressable storage. The method includes receiving, by a host, from a first application running on a processor, a request for memory allocation from the ByAS. Further, the method includes deallocating, by the host, a least relevant page to a second application and moving a content, related to the least relevant page, to the BlAS in a first BlAS location based on the request. Further, the method includes allocating, by the host, the least relevant page to the first application and updating a cache metadata and a page lookup table of the first application and the second application based on the allocation and deallocation.

Some example embodiments disclose a host for converting an electronic flash storage device comprising a ByAS and a BlAS as a single byte addressable storage. The host comprises a processor coupled with a memory controller. The memory controller is configured to receive, from a first application running on the processor, a request for memory allocation from the ByAS. Further, the memory controller is configured to deallocate a least relevant page to a second application and move a content, related to the least relevant page, to the BlAS in a first BlAS location based on the request. Further, the memory controller is configured to allocate the least relevant page to the first application and update a cache metadata and a page lookup table of the first application and the second application based on the deallocation and allocation.

Some example embodiments disclose an electronic flash storage device. The electronic flash storage device includes a controller interfaced with an external processor. The controller is configured to detect a disconnection of power to the host. The controller is configured to save a copy of data in the ByAS to a special area in the BlAS if the ByAS is of volatile media. The controller is configured to enable, applications running on a plurality of cores of the processor, to continue the execution on a next power on. The controller is configured to enable, applications running on the plurality of cores of the processor, to restore the mappings to the host on the next power on.

These and other aspects of some example embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of some example embodiments herein without departing from the spirit thereof, and some example embodiments herein include all such modifications.

BRIEF DESCRIPTION OF THE DRAWINGS

Some example embodiments illustrated in the accompanying drawings, throughout which like reference letters indicate corresponding parts in the various figures. Some example embodiments herein will be better understood from the following description with reference to the drawings, in which.

DETAILED DESCRIPTION OF EXAMPLE EMBODIMENTS

Some example embodiments herein achieve a method of converting an electronic flash storage device having a ByAS and a BlAS to a single byte addressable storage. The method includes receiving, by the host, a request for memory allocation from the ByAS, the receiving being from a first application running on a processor. Further, the method includes deallocating, by the host, a least relevant page in a second application, and moving a content, related to the least relevant page, to the BlAS in a first BlAS location based on the request. Further, the method includes allocating, by the host, the least relevant page to the first application, and updating a cache metadata and a page lookup table of the first application and the second application based on the deallocation and allocation.

Some example embodiments may be used to transparently integrate flash devices into the memory device and expand the available memory in the memory device. Some example embodiments utilizes a device cache and a flash backend to provide better persistence in the memory device.

The method may be used to handle the page faults for 'solid state drive (ssd) virtual areas'. The method may provide better persistence for all the allocated 'ssd virtual areas' over power cycles. The method mat be used to handle the mapping tables and handle metadata overhead for high capacity SSD. The method may be used to support multiple processes while concurrently mapping the SSD areas. The method may be used to identify the process for a saved metadata after a sudden power off (SPO) event.

The method may be used to enable persistency of the memory device by at least one of, (i) creating a snapshot and restoring the snapshot, (ii) reverse mapping of a cache entry to a process, (iii) having a policy for placement of a data structure (DS) in a cache/host RAM, (iv) restoring application context, or (v) handling change of virtual address after an SPO event. The method may be used to reduce metadata for a backing store by at least one allocation granularity on zone basis, global mappings for the process into the flash page, handling multiple processes, and/or handling allocation information for each process.

Some example embodiments may be implemented in flash based devices with an on-board byte addressable memory (which may act as cache) and a flash backend.

Figure 1:
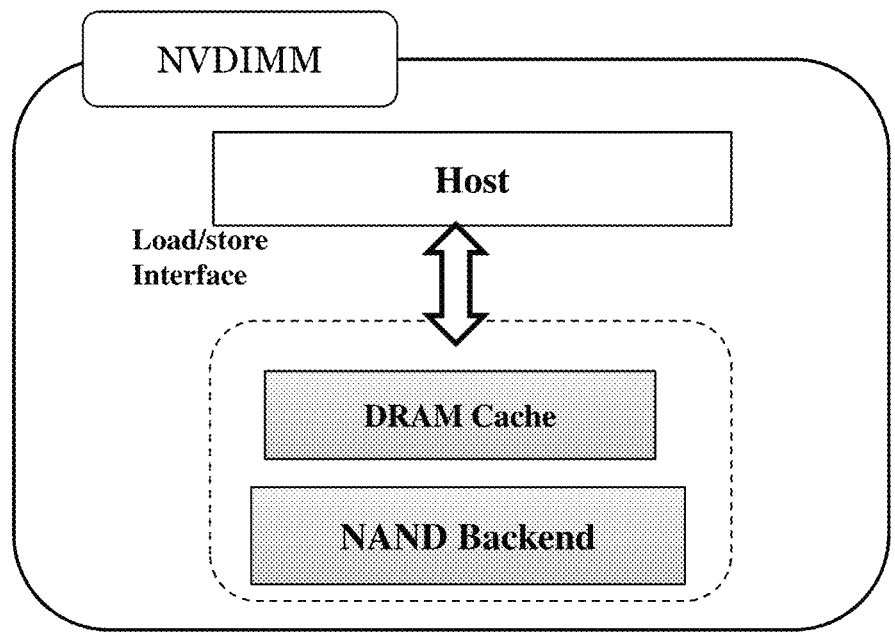
FIG. 1 is a diagram for NVDIMM class of devices which has a DRAM cache and flash backend inside, according to prior art.
Figure 2:
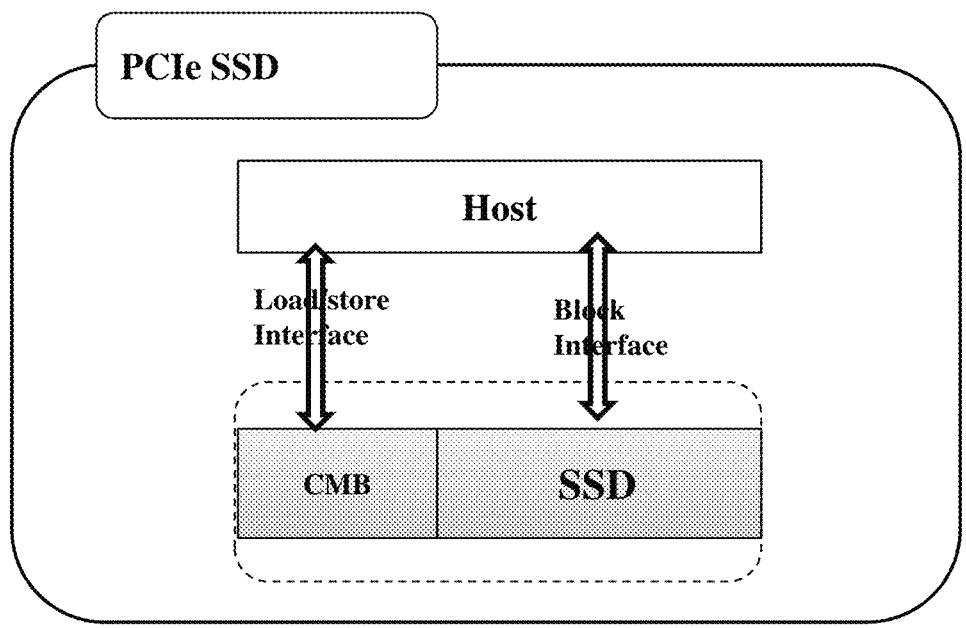
FIG. 2 is a diagram for PCIe SSD devices which has a byte addressable controller memory buffer (CMB) area as cache and block addressable SSD area as backend, according to prior art.
Figure 3:
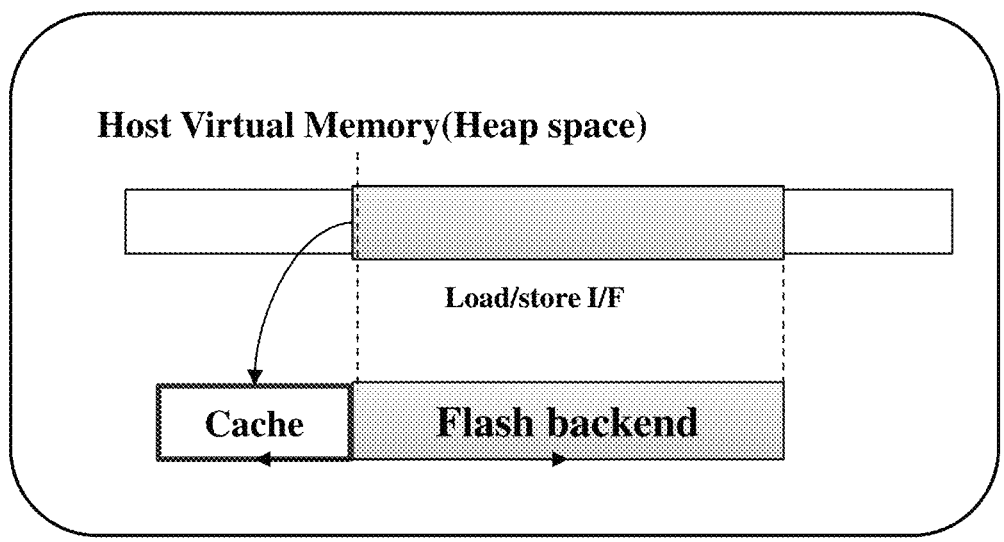
FIG. 3 shows a manner in which a typical host would view a storage device with byte addressable cache and block addressable backend as a single byte addressable device, according to prior art.

Referring now to the drawings, FIGS. 1-3 illustrate prior art.

FIG. 1 is a diagram for a non-volatile dual inline memory module (NVDIMM) class of devices which has a DRAM cache and flash backend inside.

FIG. 2 is a diagram for peripheral component interconnect express (PCIe) solid state device (SSD) devices which has a byte addressable CMB area as cache and block addressable SSD area as backend.

FIG. 3 shows a manner in which a typical host would view a storage device with byte addressable cache and block addressable backend as a single byte addressable device.

Referring now to the drawings, and more particularly to FIGS. 4a through 13, there are shown some example embodiments.

Figure 4A:
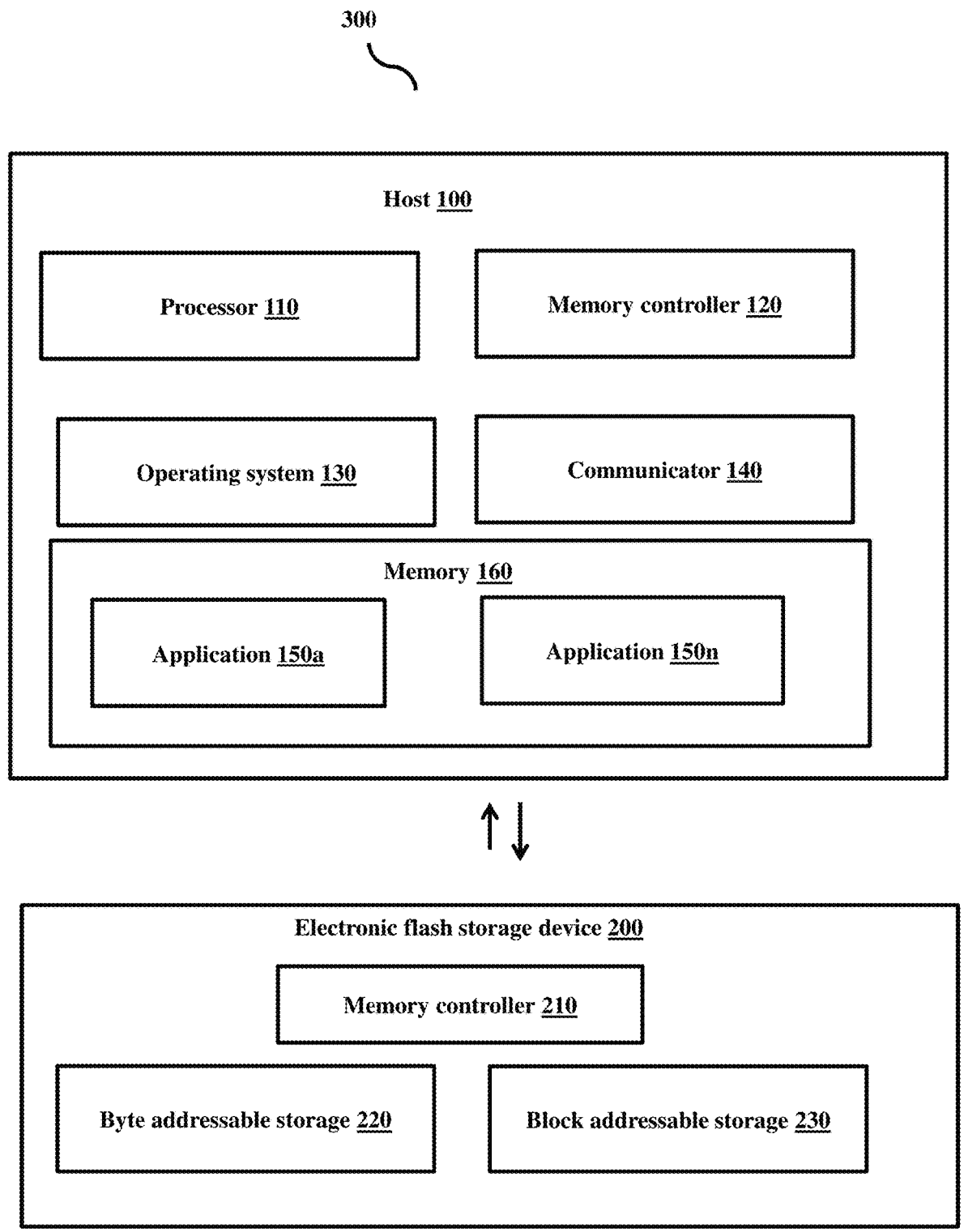
FIG. 4a illustrates an overview of a system for converting an electronic flash storage device comprising a ByAS and a BlAS as a single byte addressable storage, according to some example embodiments.

FIG. 4a illustrates an overview of a system 300 for converting an electronic flash storage device 200, including a ByAS 220 and a BlAS 230, to a single byte addressable storage according to some example embodiments. In some example embodiments, the system 300 includes a host 100 and the electronic flash storage device 200. The host 100 may be or may include, for example, but not limited to be, a smart phone, a personal computer, a laptop, a server, a smart watch, or the like. In some example embodiments, the host 100 includes a processor 110, a memory controller 120, a memory 160 storing computer readable instructions that, when executed by the processor, cause the processor to execute a plurality of application 150a-150n, an operating system 130, and/or a communicator 140. In some example embodiments, the electronic flash storage device 200 includes a memory controller 210, a ByAS 220 and a BlAS 230. The applications 150a-150n may be or include, for example, but not limited to be, a big data analytics application, an in-memory databases, a gaming application, and/or or the like The ByAS 220 is a storage device which may be accessed in a bytewise manner. The ByAS 220 may be or may include, for example, but not limited to, a DRAM, a NOR flash or the like. In NVDIMM, the DRAM is used as a cache. The BlAS 230 is a storage which may be accessed in a blockwise manner. The BlAS 230 may be or include, for example, but not limited to, a NAND flash, SSD or the like. In a NVDIMM, NAND flash is used as a backend. The NAND flash may be or may include, for example, single level cell (SLC), multi-level cell (MLC), and/or triple-level cell (TLC) arrays; however, inventive concepts are not limited thereto. The NAND flash may be or may include, for example, two-dimensional (2D) cells and/or three-dimensional (3D) cells; however, inventive concepts are not limited thereto.

The processor 110 is coupled with the memory controller 120, the applications 150a-150n, the operating system 130, and the communicator 120.

In some example embodiments, the memory controller 120 is configured to receive, from a first application 150a running on the processor 110, a request for memory allocation from the ByAS 220.

Based on the request, the memory controller 120 is configured to detect that pages of the ByAS 220 are allocated to other applications 150b running on a plurality of cores of the processor 110. Further, the memory controller 120 is configured to identify the least relevant page in the ByAS 220, and identify allocation of the least relevant page to a second application 150b based on the identified least relevant page in the ByAS 220. Further, the memory controller 120 is configured to deallocate the least relevant page allocated to the second application 150b, and to move the content, related to the least relevant page, to the BlAS 230 in the first BlAS location.

In some example embodiments, the least relevant page in the ByAS 220 is identified by analyzing at least one of frequency of accessing of the least relevant page, probability of accessing the least relevant page, an input from the scheduler OS input, suitability of selecting the least relevant page based on input from the electronic flash storage device (200), and suitability of selecting the least relevant page by analyzing the memory device characteristics Further, the memory controller 120 is configured to allocate the least relevant page to the first application 150a, and update a cache metadata and a page lookup table of the first application 150a and the second application 150b based on the deallocation and allocation.

In some example embodiments, the least relevant page of the first application 150a is allocated and the cache metadata and the page lookup table of the first application 150a are updated by updating the deallocation of the least relevant page in the cache metadata and updating the first BlAS location in the page lookup table of the first application 150a. In some example embodiments, the least relevant page in the ByAS 220 is identified by continuously analyzing a host parameter.

In some example embodiments, the ByAS 220 is enabled by using host page tables to map device cache pages. Alternatively or additionally, the ByAS 220 is enabled by using inputs from the host 100 to proactively bring pages into the device cache to avoid cache missing. In another embodiment, the ByAS 220 is enabled by using NAND awareness to allocations, so as to improve NAND endurance. Alternatively or additionally, the ByAS 220 is enabled by policy for a device cache eviction. Alternatively or additionally, the ByAS 220 is enabled by evict page selection based on inputs from OS scheduler such as run queue and priority of a task.

In some example embodiments, the processor 110 is configured to analyze the host parameters continuously, and pro-actively fetch the pages to cache (e.g., pages which are likely to be accessed in future), thus avoiding a page fault. Alternatively or additionally, the processor 110 is configured to analyze the OS scheduler data structures and states and check the run queue and priorities, so as to determine to know which process/task is likely to be executed next. Since the driver is aware of the list of device pages allocated by each process, the processor 110 identifies the pages, fetches the pages to cache, and updates the page tables, so as to avoid PFs on the pages. Since the page fault may involve cache eviction also, those pages are also identified by inputs from the OS scheduler (not shown). The movement of pages between the cache and backend is in the group of pages, rather than a single page, and the size and the grouping are decided by the backend device characteristics (e.g., NAND awareness). The processor 110 analyzes the properties of backend storage, and chooses a grouping which will make use of pipelining (e.g., reduce and/or minimize the number of operations) in backend and improve the flash endurance.

Further, the processor 110 may allocate a stream for each application 150a-150n, and may allocate pages separately for each stream. The allocation policy and the page selection will be different for each stream, so that the pages accessed by the application 150a-150n will be grouped. The processor 110 stores pages in such a way that, the storage and retrieval of those pages in a group is done in an efficient way. Also, if a page belonging to the stream is accessed, the subsequent page in the same stream is brought to the cache to avoid page fault.

Further, the memory controller 210 sends an early completion to the host 100 even before data is actually flushed to the electronic flash storage device 200 in cache eviction. The data is stored in a temporary buffer and flushed later. The memory controller 210 allows pinning of some pages to the cache. Those pages cannot be evicted. The electronic flash storage device 200 may pin some frequently accessed pages and/or metadata to the cache.

In some example embodiments, the memory controller 210 is configured to detect a disconnection of power, e.g. an SPO, to the host 100. Based on the disconnection of power, the memory controller 210 is configured to save a copy of data in the BlAS 230. After saving the copy of data in the BlAS 230, the memory controller 210 is configured to enable the applications 150a-150n running on the plurality of cores of the processor 110 to continue the execution on a next power on. The memory controller 210 is configured to enable the applications 150a-150n running on the plurality of cores of the processor 110 to restore the mappings to the electronic flash storage device 100 on the next power on.

In a non-limiting example, the cache area is saved by the firmware to the NAND backbone during the SPO (e.g., snapshot creation & restore), and the saved data is reloaded to cache on the next power up.

Alternatively or additionally, process identification information is kept in the metadata. A process hash value based on the process name is kept in a cache management table (CMT) and/or a global mapping table (GMT). This hash value is unique, and is the same across SPOs. After an SPO, a host application may initiate the process of identifying the metadata to which the SPO is associated. Then, a new process identifier (PID) is updated in the CMT, while the GMT works without any change placement of a data structure. All the cache management data structures, usage bitmaps, etc. are kept in the cache, while global management table is kept in backend only. These will be saved in the SPO. The application specific data structures which denotes the pages allocated to each application are kept in the RAM. They may be lost in SPO, but may be rebuilt.

In order to handle change of virtual address after SPO, only offsets are used in the metadata instead of actual address, so that all metadata regarding the application context (i.e., CMT and GMT) works seamlessly after restore.

The GMT maps virtual segments to SSD/NVDIMM segments. The GMT is used for each allocated zone. The process information is used for the fast lookup of allocated zones for the process and the process information is useful in page fault and cache eviction. The process information is stored in a RAM radix tree.

The RAM radix tree maps process virtual address to device zone (e.g., logical space). Further, the size of the RAM Radix tree is proportional to the actual number of entries. The free physical zones and the free segments are determined using a Bitmap.

The GMT is provided for each physical zone. The GMT includes a header containing a process hash information. In the GMT, entries are indexed by virtual segments in the virtual zone. The GMT maps to physical segments in the mapped physical zone. The process hash information is stored sequentially in the first logical blocks in the memory device.

The GMT is used for each allocated physical zone and the GMT is stored in the initial logical block addresses (LBAs) of SSD. The GMT is cached in a CMB area. The GMT contains virtual segment to SSD segment mapping in the physical zone. The header contains information about processes which are mapped, and a process hash is used to identify the process after the SPO. The identification procedure may, or must, be initiated by the application 150a-150n. Below, according to non-limiting example embodiments, table 1 indicates the header and the process hash in the GMT.

TABLE 1

Zone 1 GMT

| Header | |
|---|---|
| Table index (Virtual Seg) | Process Hash SSD Seg no |
| 1 | 225 ... |
| 2 | 666 ... |
| ... | ... |
| XX | 679 ... |

In some example embodiments, the method may be used to handle the page fault when there is no page table entry (PTE) in the SSD allocated virtual page.

In some example embodiments, the processor 110 obtains the zone info from the virtual address (using the lookup of the radix tree to obtain physical zone). If the virtual address is mapped to the physical zone, the processor 110 obtains the GMT from the cache/backend. The processor 110 obtains the segment index inside the zone. If the segment is not mapped, the processor 110 checks the free segments in the bitmap for free segments. The processor 110 obtains the segment into the cache and updates the GMT for the zone and proceed to CMT update.

In some example embodiments, if the virtual address is not mapped to the physical zone, the processor 110 obtains the free physical zone and lookup the bitmap for free zones.

Further, the processor 110 assigns the segment inside the zone. Further, the processor 110 obtains the segment into the cache, update the GMT for the zone and proceed to CMT update. Even though the page fault is for one RAM page, granularity is at multiple of RAM pages (segments).

In some example embodiments, the CMT keeps the process hash (for example, 32 bits), Process ID (for example, 22 bits), and virtual page number (for example, ~30 bits). The CMT provides an index by cache entries and granularity in terms of segments. This table is kept in CMB buffer and may or must be saved in response to an SPO. In a non-limiting example, for cache of 128 MB, segment size of 64K and CMT size ~2 MB.

Further, the CMT provides an information about each cache entry useful while eviction. The CMT provides information in segment basis and maps to a process in the PTE entry.

The CMT provides a reverse mapping of memory management unit (MMU) PTEs and granularity in terms of segments, not pages. In the CMT, the mapping information is used at eviction of entry and the process's PTE is tracked and invalidated. In the CMT, the header contains Bitmap of free entries and a process hash used to identify the process during reload after SPO. In an example, the CMT contains Hash (28 bits) and Tag (4 bits). Below, table 2 indicates the header and the Bitmap of free entries in the CMT.

TABLE 2

| Header | Bitmap of free entries | | |
|---|---|---|---|
| Table index (Buffer index) | Process Hash (32 bits) | PID (22 bits) | VPage no (30 bits) |
| 1 | XXXFF | 56 | 234 ... |
| 2 | ... | 23 | 457 ... |
| ... | ... | ... | ... |
| XX | YYZZ | 1248 | 735 ... |

The processor 110 examines the bitmap in the CMT header to find any free entries. If no free entry is found, the memory controller 120 selects the oldest entry by means of Age field in the CMT. The memory controller 120 invalidates the MMU PTE for the selected entry for eviction (e.g., thus invalidating cache page). The same PTE is not used further for storing any valid information, because (unlike the swapping method in the OS (130)) too many unused PTEs will waste RAM space. Further, the memory controller 120 evicts the chosen buffer entry. Further, the memory controller 120 writes the buffer back to backend. Further, the memory controller 120 updates the GMT, if not updated so far for the evicted entry. Further, the memory controller 120 calculates the process hash (28 bits) and tag (4 bits) based on 'process name' (in an example, '/proc/'pid'/cmdline' is used in Linux systems). Further, the memory controller 120 calculates the segment information for the new page. Further, the memory controller 120 updates CMT entry with new mapping.

Further, the memory controller 120 creates the PTE for the faulted virtual page to the selected cache page. Further, the memory controller 120 creates/updates PTE for the neighboring PTEs also. Granularity is at multiple of RAM pages (segments).

The PID is used to find the process for eviction, and an accessed bit of PTE is used to check recent access (like swapping).

The device memory is divided into a number zones, each of ~1 MB, e.g. 1 MB, corresponding to the granularity of virtual and physical allocation. A process is allocated a number of zones. The zones may be further divided into segments, each of ~64 KB, e.g. 64 KB.

Segments may correspond to a NAND page, corresponding to a small, e.g., a minimum, granularity of metadata. Any cache flush happens in segments.

The method may be used to ensure quality of service (QoS) for applications by PID based segregation (streams) for different applications. The method may be used to improve performance by sending early acknowledge to host on write ops, before actually sending the data to a backend.

In some example embodiments, the memory controller 210 is configured to receive data from the processor 110. Further, the memory controller 210 is configured to determine that the received data is scrambled, e.g. substituted. Further, the memory controller 210 is configured to process the received data using at least one of descrambling (e.g. substitution) or deswizzling (e.g. permutation), if the received data is scrambled. Further, the memory controller 210 is configured to save the processed data in the electronic flash storage device 200. The descrambling may correspond to the process of randomizing the data through procedure. The host 100 may scramble the data before transmitting through a bus and descramble it on receiving it back. In a non-limiting example, 0xABCD (original)→0x1234 (Scrambled)→0xABCD (Descrambled). The deswizzling (e.g. permutation) is the process of mixing the data lines on sending the data (thus making the data unrecognizable). In a non-limiting example, 0xABCD (original)→0xCBDA (Swizzled)→0xABCD (Deswizzled).

In an example, a host data on the DIMM bus will be encrypted by the memory controller 210, so that the electronic flash storage device 200 will not be able to decode the host data. In normal cases, this decoding is not required as normal DRAM is not required to interpret the host data. In some example embodiments, the electronic flash storage device 100 is to interpret the host commands and take actions, so that the memory controller 210 selectively decrypts the host data in the command areas. The memory controller 210 undoes all the encryption (scrambling/swizzling or substitutions/permutations) done by the electronic device. This is to be done only for the commands sent by the electronic device, not for the data. Similarly, when host reads the data from DRAM, it is decrypted (descrambled and/or deswizzled). So, when the electronic flash storage device 200 is sending a status to the host 100, the status is already descrambled/deswizzled from the device itself, to compensate for the host descambling/deswizzling.

In some example embodiments, the commands such as RESET, Device_Info are sent using side-band communication, such as SMBUS etc. These commands are used when the DIMM bus is not ready for communication.

The OS 130 allocates physical pages in terms of 4 KB (RAM pages) during the page fault. The communicator 140 is configured for communicating internally between internal hardware components and with external devices via one or more networks.

Although the FIG. 4 shows various hardware components of the system 300, it is to be understood that other embodiments are not limited thereon. In other embodiments, the system 300 may include less or more number of components. Further, the labels or names of the components are used only for illustrative purpose and does not limit the scope of inventive concepts. One or more components may be combined together to perform same or substantially similar function to convert the electronic flash storage device 200 as the single byte addressable storage.

Figure 4B:
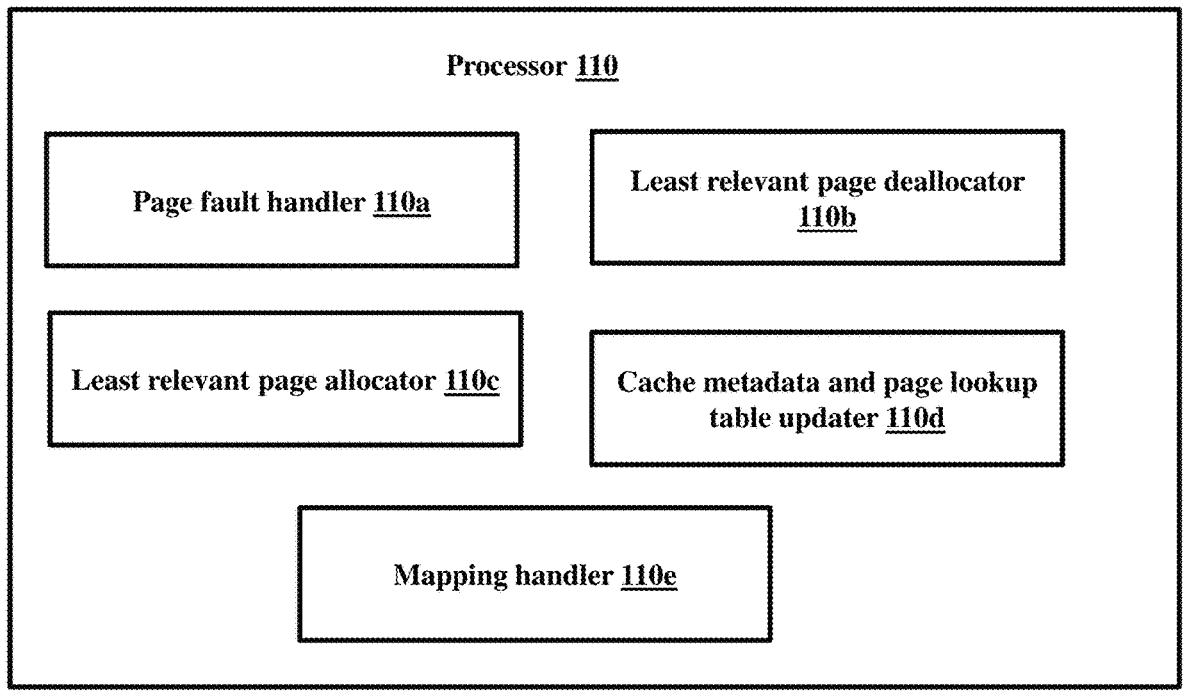
FIG. 4b illustrates various elements in a processor included in a host interfacing the electronic flash storage device, according to some example embodiments.

FIG. 4b illustrates various elements in the processor 110 included in the host 100, according to some example embodiments. In some example embodiments, the processor 110 includes a page fault handler 110a, a least relevant page deallocator 110b, a least relevant page allocator 110c, and a cache metadata and page lookup table updater 110d.

The page fault handler 110a is coupled with the least relevant page deallocator 110b, the least relevant page allocator 110c, and the cache metadata and page lookup table updater 110d. In some example embodiments, the memory controller 120 is configured to receive, from the first application 150a running on the processor 110, a request for memory allocation from the ByAS 220. Based on the request, the least relevant page allocator 110c is configured to detect that pages of the ByAS 220 are allocated to other applications 150b running on the plurality of cores of the processor 110. Further, the least relevant page allocator 110c is configured to identify the least relevant page in the ByAS 220, and identify allocation of the least relevant page to a second application 150b based on the identified least relevant page in the ByAS 220. Further, the least relevant page deallocator 110b is configured to deallocate the least relevant page to the second application 150b and move the content of the least relevant page to the BlAS 230 in the first BlAS location.

Further, the least relevant page allocator 110c is configured to allocate the least relevant page to the first application 150a, and to update the cache metadata and the page lookup table of the first application 150a and the second application 150b based on the allocation and deallocation using the cache metadata and page lookup table updater 110d.

In some example embodiments, the page fault handler 110a is configured to analyze the host parameters continuously, and pro-actively fetch the pages to cache (e.g., pages which are likely to be accessed in future), thus avoiding the page fault. Alternatively or additionally, the page fault handler 110a is configured to analyze the OS scheduler data structures and states, and check the run queue and priorities, so as to determine to know which process/task is likely to be executed next. Since the driver knows the list of device pages allocated by each process, the page fault handler 110a identifies the pages, fetches the pages to cache and updates the page tables, so as to avoid PFs on the pages. Since the page fault may involve cache eviction also, those pages are also identified by inputs from the OS scheduler. The movement of pages between the cache and backend is in the group of pages rather than a single page, and the size and the grouping decided by the backend device characteristics (e.g., NAND awareness). The page fault handler 110a analyzes the properties of backend storage, and chooses a grouping which will make use of pipelining (e.g., reduced and/or minimize the number of operations) in backend and improve the flash endurance.

Further, the page fault handler 110a may be used allocate a stream for each application 150a-150n, and allocate pages separately for each stream. The allocation policy and the page selection will be different for each stream, so that the pages accessed by the application 150a-150n will be grouped. The page fault handler 110a store them in such a way that, the storage and retrieval of those pages in a group is done in an efficient way. Also, if a page belonging to the stream is accessed, the subsequent page in the same stream is brought to the cache to avoid page fault.

Further, the electronic device 200 sends an early completion to the host 100 even before data is actually flushed to the backend 140 in cache eviction. The data is stored in a temporary buffer, and is flushed later. The device 100 allows pinning of some pages to the cache. Such pinned pages cannot be evicted. The host 100 may pin some frequently accessed pages/metadata to the cache.

In some example embodiments, the page fault handler 110a obtains the zone info from the virtual address (using the lookup of the radix tree to obtain physical zone). If the virtual address is mapped to the physical zone, the page fault handler 110a obtains the GMT from cache/backend. The page fault handler 110a obtains the segment index inside the zone. If the segment is not mapped, the page fault handler 110a checks the free segments in the bitmap for free segments. The page fault handler 110a obtains the segment into the cache and updates the GMT for the zone and proceed to CMT update.

Alternatively or additionally, if the virtual address is not mapped to the physical zone, the page fault handler 110a obtains the free physical zone and lookup the bitmap for free zones. Further, the page fault handler 110a assigns the segment inside the zone. Further, the page fault handler 110a obtains the segment into the cache, update the GMT for the zone and proceed to CMT update. Even though the page fault is for one RAM page, granularity is at multiple of RAM pages (segments).

Further, the page fault handler 110a creates the PTE for the faulted virtual page to the selected cache page. Further, the memory controller 120 creates/updates PTE for the neighboring PTEs also. Granularity is at multiple of RAM pages (segments).

The PID is used to find the process for eviction and accessed bit of PTE is used to check recent access (like swapping).

Although the FIG. 4b shows various hardware components of the processor 110, it is to be understood that other embodiments are not limited thereon. In other embodiments, the processor 110 may include less or more number of components. Further, the labels or names of the components are used only for illustrative purpose and does not limit the scope of the invention. One or more components may be combined together to perform same or substantially similar function to convert the electronic flash storage device 200 as the single byte addressable storage.

Figure 5:
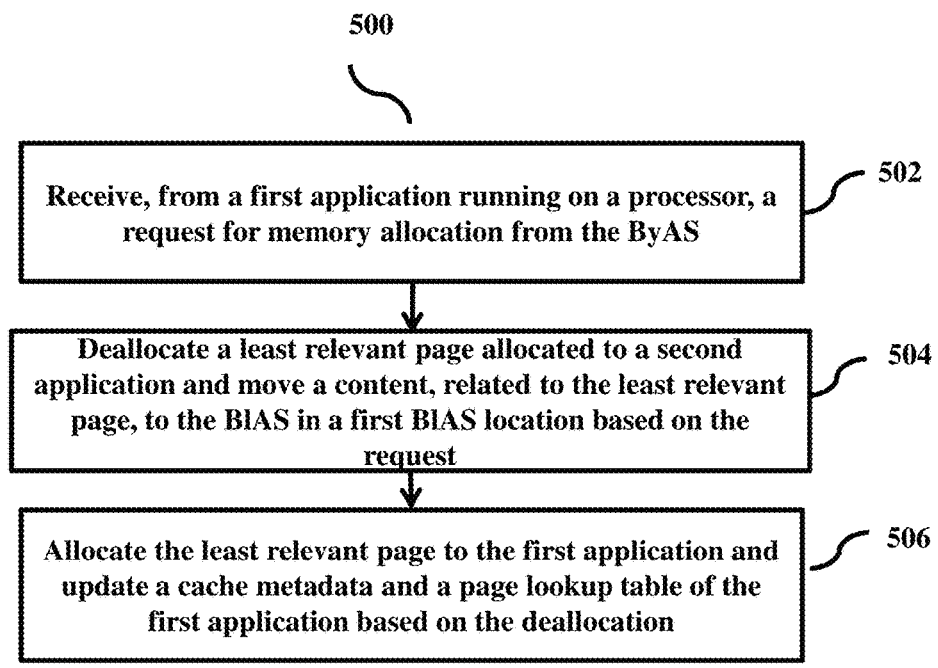
FIG. 5 is a flow diagram illustrating various operations, implemented by the host, for converting an electronic flash storage device having the ByAS and the BlAS as a single byte addressable storage, according to some example embodiments.

FIG. 5 is a flow diagram 500 illustrating various operations, implemented by the electronic flash storage device 100, for converting the electronic flash storage device 200 having the ByAS 220 and the BlAS 230 to a single byte addressable storage, according to some example embodiments. The operations (502-506) are performed by the memory controller 120. At 502, the method includes receiving, from the first application 150a running on the processor 110, the request for memory allocation from the ByAS 220. At 504, the method includes deallocating the least relevant page allocated to the second application 150b and moving the content, related to least relevant page, to the BlAS 230 in the first BlAS location based on the request. At 506, the method includes allocating the least relevant page to the first application 150a and updating the cache metadata and the page lookup table of the first application 150a and the second application 150b based on the allocation and deallocation.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
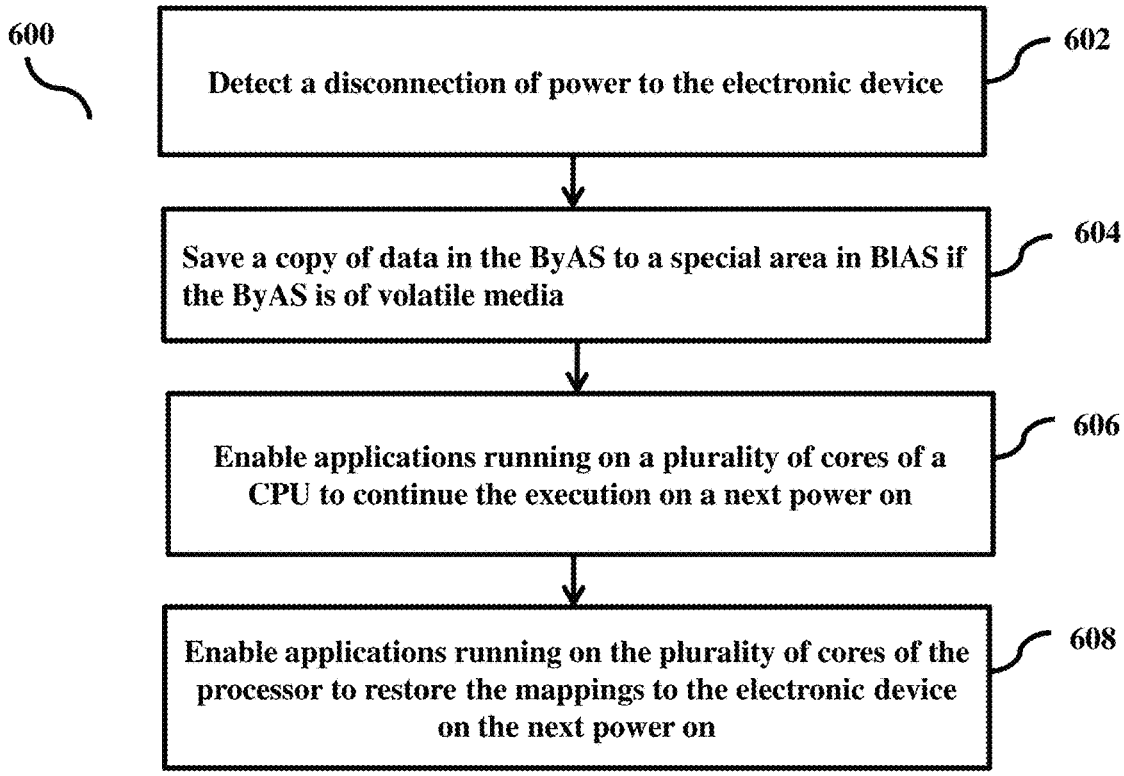
FIG. 6 is a flow diagram illustrating various operations, implemented by the electronic flash storage device, for enabling data persistency in the electronic flash storage device, according to some example embodiments.

FIG. 6 is a flow diagram 600 illustrating various operations, implemented by the electronic flash storage device 200, for enabling data persistency in the electronic flash storage device 200, according to some example embodiments. The operations (602-608) are performed by the memory controller 210. At 602, the method includes detecting and/or determining a disconnection of power to the memory device, e.g. an SPO. At 604, the method includes saving the copy of data in the ByAS 220 to the special area in the BlAS 230 if the ByAS 220 is or includes volatile media. At 606, the method includes enabling the applications running on the plurality of cores of the processor 110 to continue the execution on the next power on. At 608, the method includes enabling the applications 150a-150n running on the plurality of cores of the processor 110 to restore the mappings to the memory device on the next power on.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
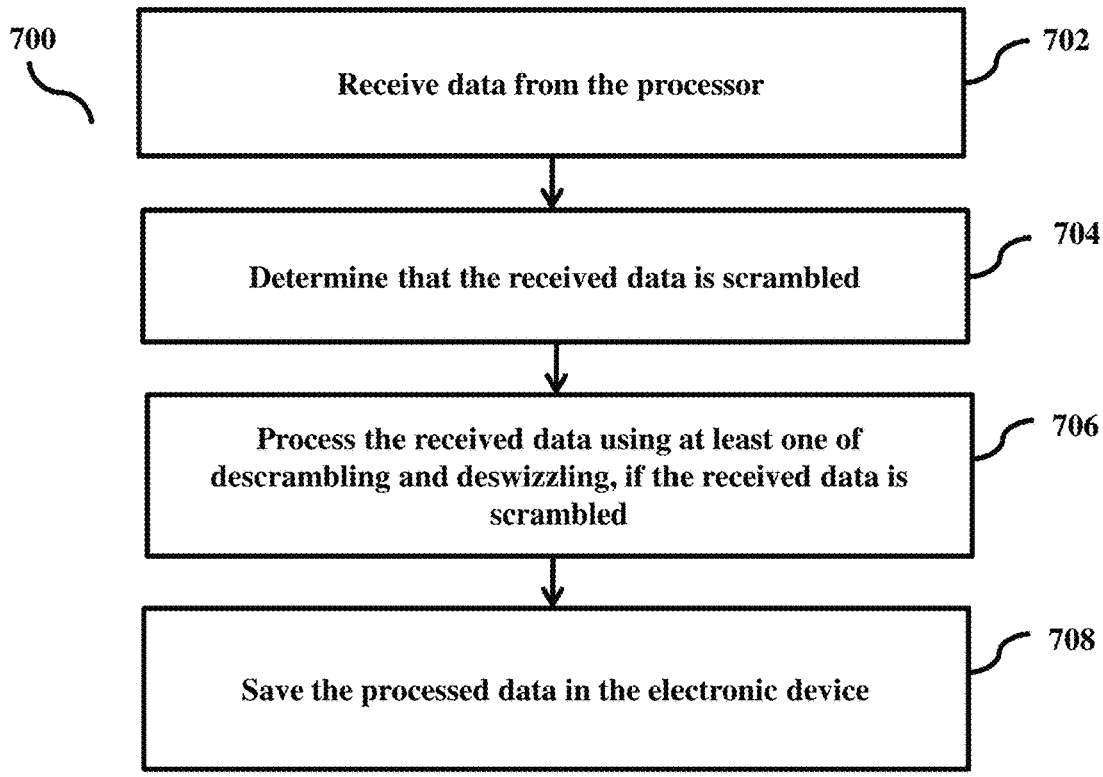
FIG. 7 is a flow diagram illustrating various operations, implemented by the electronic flash storage device, for receiving an encrypted communication data in an electronic flash storage device, according to some example embodiments.

FIG. 7 is a flow diagram 700 illustrating various operations, implemented by the electronic flash storage device, for receiving an encrypted communication data in an electronic flash storage device, according to some example embodiments. The operations (702-708) are performed by the memory controller 210. At 702, the method includes receiving the data from the processor 110. At 704, the method includes determining that the received data is scrambled (substituted). At 706, the method includes processing the received data using at least one of descrambling and deswizzling, if the received data is scrambled. At 708, the method includes saving the processed data in the memory device.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
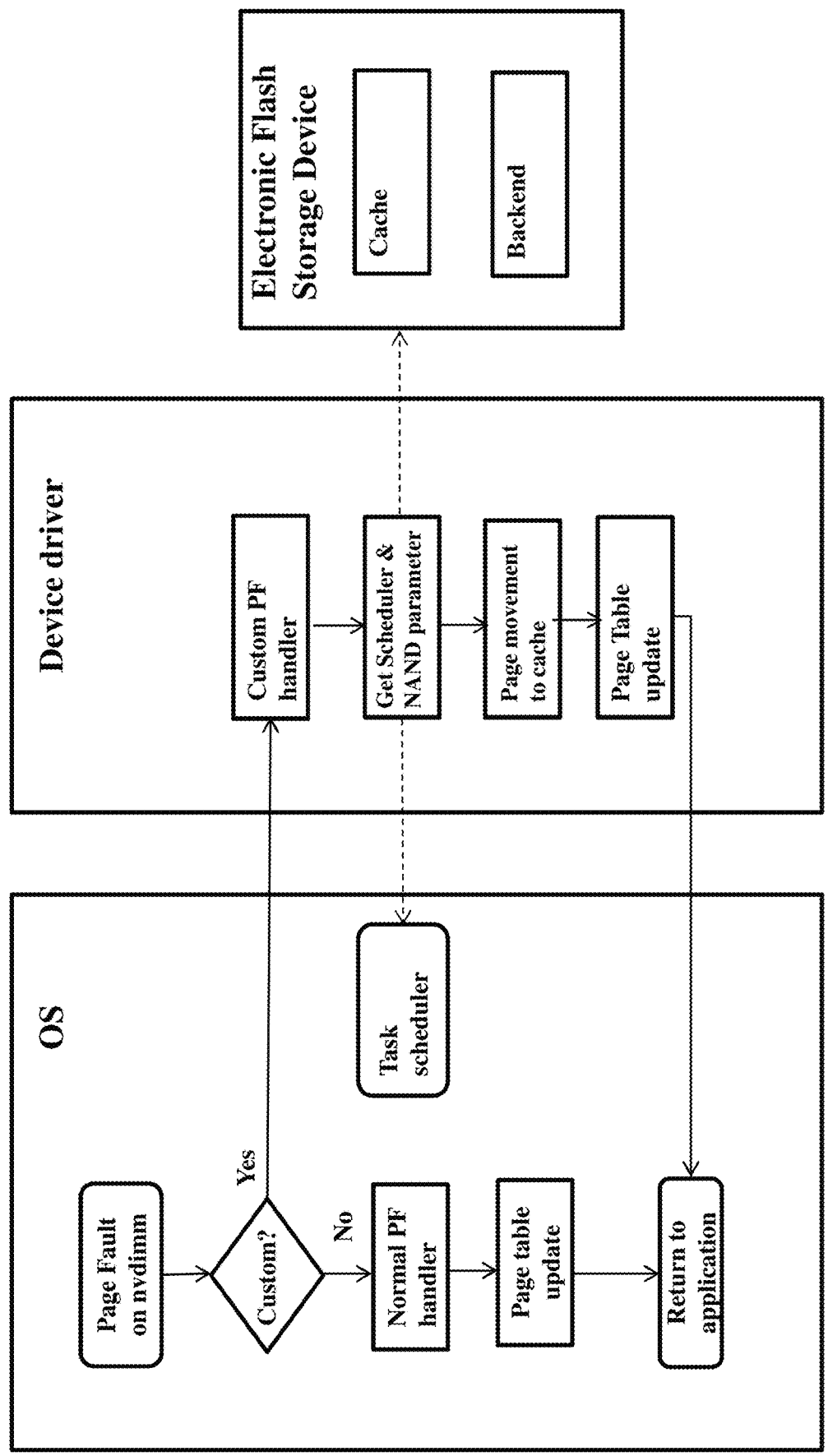
FIG. 8 shows a role of a custom page handler, according to some example embodiments.
Figure 9:
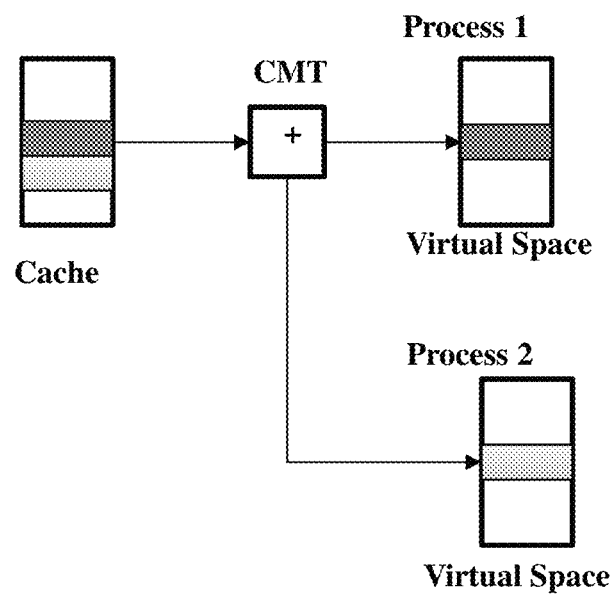
FIG. 9 shows how CMT is used to store the cache mapping information across different processes, according to some example embodiments.
Figure 10:
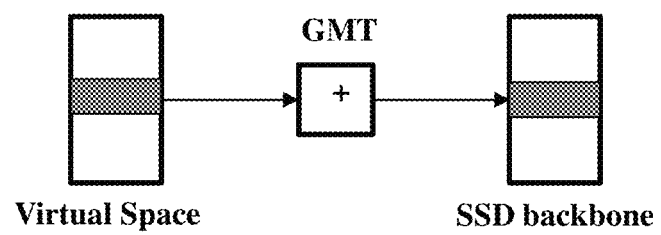
FIG. 10 shows how GMT mapping is used to store mappings of SSD backend pages, according to some example embodiments.
Figure 11:
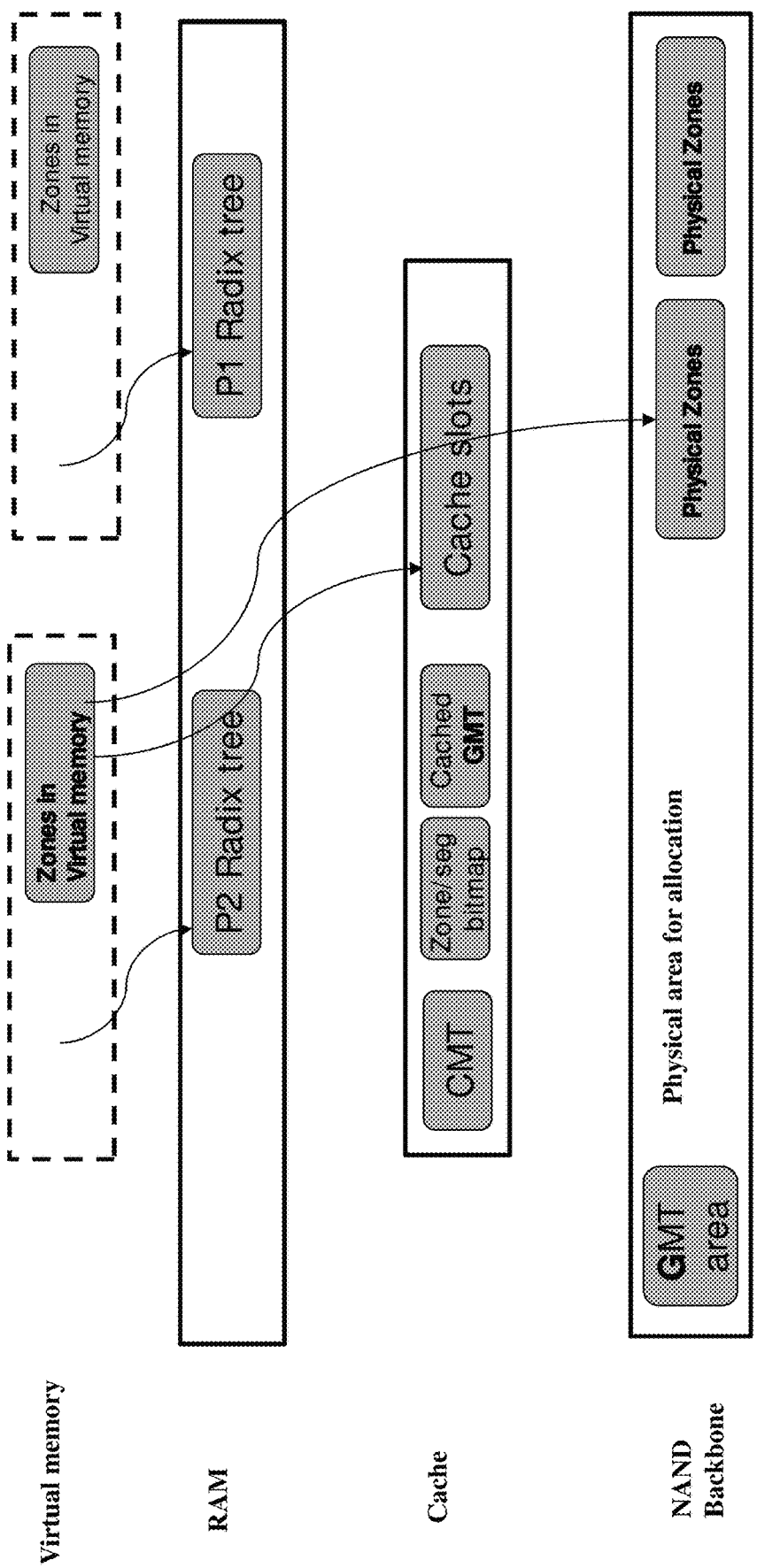
FIG. 11 illustrates an overview of data structures, according to some example embodiments.

FIG. 8 shows a role of the page fault handler 110a, according to some example embodiments. The custom PF handler is responsible for getting the scheduler parameters from the OS 130 and NAND parameters from the host 100. The operations and functions of the page fault handler 110a is already explained in conjunction with the FIG. 4b. Further, the custom page fault processes are explained in conjunction with the FIG. 12 and FIG. 13. The page table update is done afterwards after considering all the relevant parameters. FIG. 9 shows how CMT is used to store the cache mapping information across different processes, according to some example embodiments. FIG. 10 shows how GMT mapping is used to store the mappings of the SSD backend pages, according to some example embodiments. FIG. 11 illustrates an overview of the data structures, according to some example embodiments.

Figure 12:
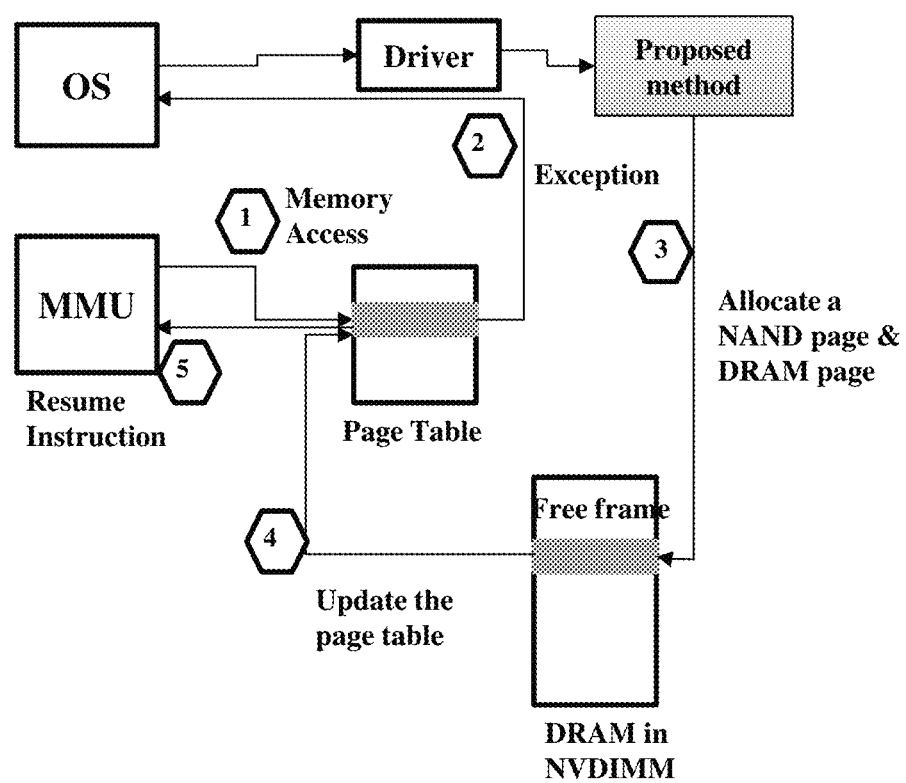
FIG. 12 is an example flow diagram illustrating a custom page fault processes in the OS for NVDIMM, according to some example embodiments.

FIG. 12 is an example flow diagram illustrating a custom page fault processes in the OS 130 for NVDIMM, according to some example embodiments. At step 1, a normal memory access results in memory access violation (page fault) detected by the MMU. At step 2, the MMU informs the OS 130 about the page fault. The OS uses the custom PF handler registered by the driver to handle the fault. The algorithm in custom PF handler allocates the NAND page and the DRAM page from the DRAM in NVDIMM based on some example embodiments. At step 4, the DRAM updates the page table about the page allocation. At step 5, the page table sends the resume instruction to the memory controller 120.

Figure 13:
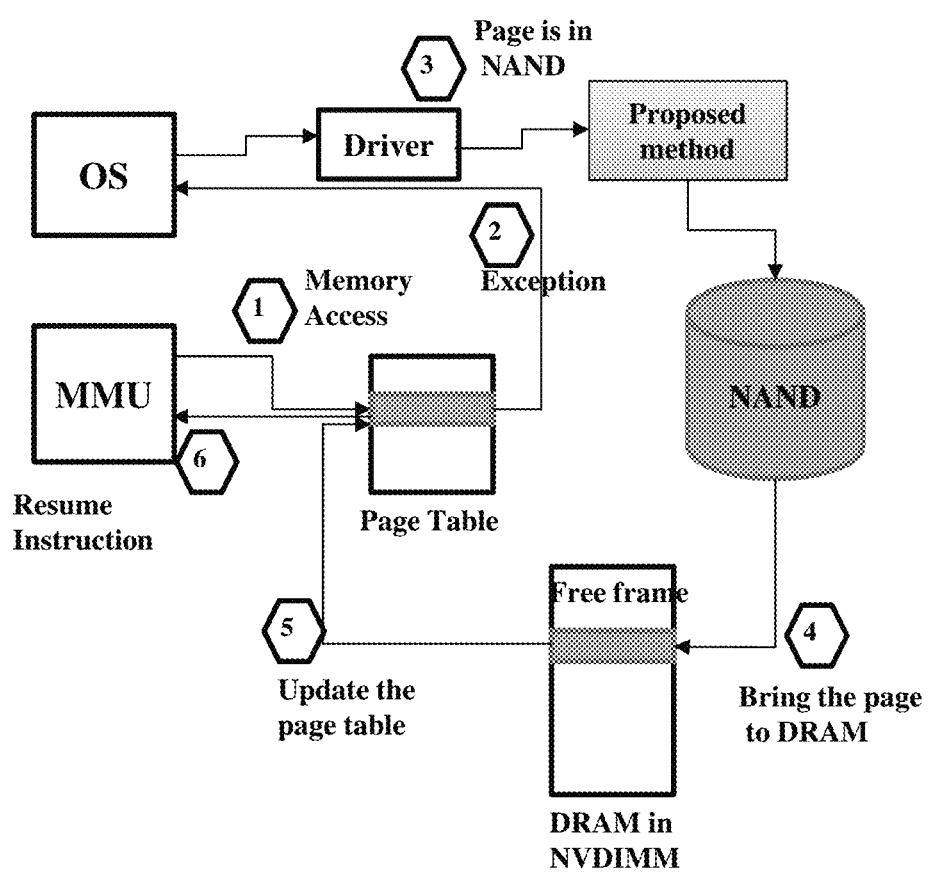
FIG. 13 is an example flow diagram illustrating a custom page fault processes in the OS for NVDIMM during a swapped page scenario, according to some example embodiments.

FIG. 13 is an example flow diagram illustrating a custom page fault processes in the OS 130 for NVDIMM during a swapped page scenario, according to some example embodiments. At step 1, the memory controller 120 sends the memory access instruction to the page table. At step 2, the page table sends the memory access instruction to the OS 130. Based on the memory access instruction, the OS 130 determines that the page in NAND and the OS 130 sends the pages to the DRAM in NVDIMM based on some example embodiments at step 3 and at step 4. At step 5, the DRAM updates the page table about the page allocation. At 6, the page table sends the resume instruction to the memory controller 120.

Some example embodiments disclosed herein may be implemented using at least one software program running on at least one hardware device and performing network management functions to control the elements.

The foregoing description of the specific embodiments will so fully reveal the general nature of some example embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while some example embodiments herein have been described in terms of preferred embodiments, those of ordinary skill in the art will recognize that some example embodiments herein may be practiced with modification within the spirit and scope of some example embodiments as described herein.

What is claimed is:

1. A method comprising:
    receiving, by a host, a request for memory allocation for a byte addressable storage (ByAS), the receiving being from a first application among a plurality of applications;
    detecting applications currently running on a processor of the host from among the plurality of applications;
    deallocating, by the host, a least relevant page of a memory space of the ByAs that is allocated to at least one second application among the detected applications while keeping the at least one second application running on the processor, the deallocating based on the request;
    moving, by the host, a content to a block addressable storage (BlAS) at a first BlAS location, the content related to the least relevant page, the moving based on the deallocation;
    reallocating, by the host, the least relevant page of the memory space to the first application; and
    updating, by the host, a cache metadata and a page lookup table of the first application and the at least one second application based on the deallocation and allocation.

2. The method of claim 1, wherein the moving the content comprises:
    detecting that pages of the ByAS are allocated to the at least one second application that are running on a plurality of cores of the processor concurrently with the first application;
    identifying the least relevant page in the ByAS;
    identifying allocation of the least relevant page to the at least one second application based on the identified least relevant page in the ByAS; and
    moving the content related to the least relevant page to the BlAS in the first BlAS location.

3. The method of claim 2, wherein the least relevant page in the ByAS is identified by analyzing at least one of (i) a frequency of accessing the least relevant page, (ii) a probability of accessing the least relevant page, (iii) an input from a scheduler operating system (OS), (iv) a suitability of selecting the least relevant page based on input from an electronic flash storage device, or (v) a suitability of selecting the least relevant page based on an analysis of memory device characteristics.

4. The method of claim 2, wherein the identifying the least relevant page in the ByAS comprises:
    continuously analyzing a host parameter; and
    identifying the least relevant page in the ByAS based on the continuous analysis of the host parameter.

5. The method of claim 1, wherein the updating the cache metadata and the page lookup table of the first application comprises:
    updating the deallocation of the least relevant page in the cache metadata;
    updating the first BlAS location in a page lookup table of the at least one second application that is running concurrently with the first application;
    allocating the least relevant page to the first application; and
    updating the cache metadata and the page lookup table of the first application based on the updated deallocation of the least relevant page in the cache metadata.

6. A host comprising:
    a memory configured to store non-transitive data; and
    a processor configured to execute machine-readable instructions that, when executed by the processor, cause the processor to perform the method according to claim 1.

7. The method of claim 1, wherein the moving includes moving over a bus, and the bus is a dual inline memory module (DIMM) bus, and the ByAS and BlAS memory share bandwidth of the DIMM bus.

8. A host comprising:
    a memory controller; and
    a processor coupled with the memory controller, configured to execute machine-readable instructions that, when executed by the processor, cause the processor to,
    receive, from a first application running on the processor, a request for memory allocation for a byte addressable storage (ByAS) in an electronic flash storage device that is separate from the host,
    deallocate a least relevant page of a memory space of the ByAs that is allocated to at least one second application of a plurality of second applications that are running concurrently on the processor with the first application, the deallocating being done while the at least one second application continues to run to the processor,
    move a content over a bus, the content stored in the least relevant page that was allocated to the at least one second application, the moving to a block addressable storage (BlAS) of the electronic flash storage device in a first BlAS location, the moving based on the request, the ByAS storage and the BlAS storage sharing the bus with the host,
    reallocate the least relevant page of the memory space to the first application, and
    update a cache metadata and a page lookup table of the first application and the at least one second application based on the deallocation and allocation.

9. The method of claim 1, wherein the detecting applications currently running on the processor includes detecting the applications that are stored on a memory of the host as computer-readable instructions.

10. The host of claim 8, wherein the bus is a dual inline memory module (DIMM) bus, and the moving includes moving over the DIMM bus, and the ByAS and BlAS memory share bandwidth of the DIMM bus.

11. The host of claim 8, wherein the processor is configured to move the content by,
    detecting that pages of the ByAS are allocated to the at least one second applications that are concurrently running on a plurality of cores of the processor,
    identifying the least relevant page in the ByAS,
    identifying allocation of the least relevant page to the at least one second application based on the identified least relevant page in the ByAS, and
    moving the content related to the least relevant page to the BlAS in the first BlAS location.

12. The host of claim 11, wherein identify the least relevant page in the ByAS comprises:
    continuously analyze a host parameter; and
    identify the least relevant page in the ByAS based on the continuous analysis of the host parameter.

13. The host of claim 10, wherein the processor is configured to update the cache metadata and the page lookup table of the first application by, updating, in a cache metadata, the deallocation of the least relevant page, updating the first BlAS location in the page lookup table of the first application, allocating the least relevant page to the first application, and updating the cache metadata and the page lookup table of the first application based on the updated deallocation of the least relevant page.

14. The host of claim 10, further comprising:

a memory configured to store computer-readable instructions corresponding to the applications currently running on the processor.

\* \* \* \* \*